United States Patent
Gesell et al.

(10) Patent No.: US 8,551,582 B2
(45) Date of Patent: Oct. 8, 2013

(54) LIGHT POLARIZING ARTICLES AND METHOD OF MAKING SAME

(75) Inventors: Eric Gesell, Chaintreaux (FR); David Henry, Morigny-Champigny (FR)

(73) Assignee: Corning Incorporated, Corning, NY (US)

( * ) Notice: Subject to any disclaimer, the term of this patent is extended or adjusted under 35 U.S.C. 154(b) by 1163 days.

(21) Appl. No.: 12/069,490

(22) Filed: Feb. 11, 2008

(65) Prior Publication Data

US 2008/0206577 A1     Aug. 28, 2008

(30) Foreign Application Priority Data

Feb. 28, 2007   (EP) ..................................... 07300837

(51) Int. Cl.
*G02F 1/1335*     (2006.01)
*B05D 5/06*       (2006.01)

(52) U.S. Cl.
USPC ........................... 428/1.31; 427/163.1; 349/97

(58) Field of Classification Search
USPC .......... 428/1.31–1.55, 163.1; 349/96–97, 122
See application file for complete search history.

(56) References Cited

U.S. PATENT DOCUMENTS

| | | | |
|---|---|---|---|
| 2,400,877 A | 5/1946 | Dreyer | 88/65 |
| 4,130,672 A | 12/1978 | Onoki et al. | 427/164 |
| 4,404,290 A | 9/1983 | Boudot | 501/78 |
| 4,540,672 A | 9/1985 | Boudot et al. | 501/65 |
| 4,683,153 A | 7/1987 | Goepfert et al. | 428/1 |
| 4,742,028 A | 5/1988 | Boudot et al. | 501/78 |
| 4,839,314 A | 6/1989 | Boudot et al. | 501/78 |
| 5,023,209 A | 6/1991 | Grateau et al. | 501/13 |
| 5,078,791 A * | 1/1992 | Singh et al. | 106/287.14 |
| 5,254,655 A * | 10/1993 | Gibbons et al. | 528/15 |
| 5,312,863 A * | 5/1994 | Van Rheenen et al. | 524/555 |
| 5,411,585 A * | 5/1995 | Avery et al. | 106/287.1 |
| 5,426,077 A | 6/1995 | Brocheton et al. | 501/13 |
| 5,597,622 A | 1/1997 | Zoller et al. | 427/563 |
| 5,958,169 A * | 9/1999 | Titterington et al. | 156/235 |
| 5,976,239 A * | 11/1999 | Dannenhauer et al. | 106/493 |
| 6,090,193 A * | 7/2000 | Nigam et al. | 106/31.27 |
| 6,121,176 A | 9/2000 | Comte | 501/78 |
| 6,174,394 B1 * | 1/2001 | Gvon et al. | 156/100 |
| 6,248,285 B1 | 6/2001 | Henry et al. | 264/496 |
| 6,329,482 B1 | 12/2001 | Henry | 526/260 |

(Continued)

FOREIGN PATENT DOCUMENTS

| | | |
|---|---|---|
| EP | 0171917 | 7/1985 |
| EP | 1394575 | 6/2002 |

(Continued)

*Primary Examiner* — Sophie Hon
(74) *Attorney, Agent, or Firm* — Kevin L. Bray

(57) ABSTRACT

Novel light polarizing articles comprising a substrate, a light polarizing layer comprising ion-bearing polarizing dye molecules, a coupling layer, and a protective layer, and method of making the same. Due to the presence of the coupling layer bearing counter ions, adhesion of the polarizing layer to the protective layer is improved. The light polarizing article has advantageous chemical, mechanical and thermal resistance. The light polarizing article can be used, for example, as ophthalmic products and in display devices.

23 Claims, 2 Drawing Sheets

(56) References Cited

U.S. PATENT DOCUMENTS

| | | | |
|---|---|---|---|
| 2002/0056400 A1* | 5/2002 | Nederlof et al. | 106/287.11 |
| 2002/0119325 A1* | 8/2002 | Park et al. | 428/432 |
| 2002/0195950 A1* | 12/2002 | Mikhael et al. | 315/111.21 |
| 2003/0104188 A1* | 6/2003 | Shoshi et al. | 428/212 |
| 2004/0198867 A1* | 10/2004 | Arase et al. | 523/160 |
| 2005/0003109 A1* | 1/2005 | Oiso et al. | 428/1.3 |
| 2005/0208087 A1* | 9/2005 | Kuerzinger et al. | 424/405 |
| 2005/0233246 A1* | 10/2005 | Boden et al. | 430/270.11 |
| 2006/0066947 A1 | 3/2006 | Henry | 359/491 |
| 2010/0060984 A1* | 3/2010 | Davidovits et al. | 359/491 |

FOREIGN PATENT DOCUMENTS

| | | | |
|---|---|---|---|
| EP | 1674898 | 12/2004 | |
| JP | 58/42001 | 3/1983 | |
| WO | 94/28073 | 12/1994 | |
| WO | 00/22463 | 4/2000 | |
| WO | WO 2005050265 A1 * | 6/2005 | G02B 1/10 |

* cited by examiner

LIGHT POLARIZING ARTICLES AND METHOD OF MAKING SAME

CROSS-REFERENCE TO RELATED APPLICATIONS

This application claims the benefit of priority under 35 U.S.C. §119 of European Patent Application Serial No. 07300837.7 filed on Feb. 28, 2007.

FIELD

The present invention relates to light polarizing articles and a method of making the same. In particular, the present invention relates to polarizing optical products comprising a light polarizing layer, a second functional layer over the polarizing layer and a coupling layer therebetween and a method for making the same. The present invention is useful in producing, for example, polarizing ophthalmic products, optical elements and display products.

BACKGROUND

A linear light polarizing filter allows light having an electric field in a certain plane to transmit at a higher rate than light having an orthogonal electric filed. Polarizing filters have been widely used in, for example, ophthalmic products, display devices, imaging devices and optical communication devices. Polarizing ophthalmic lenses are interesting because they have the unique ability to preferentially eliminate glare that is reflected from smooth horizontal surfaces such as water and ice.

Dichroic materials have been used for the manufacture of light polarizing articles. Dichroic materials, when properly oriented, can preferentially transmit light polarized in a particular direction. Such dichroic material may be polarizing over a relatively wide spectrum, such as the visible spectrum, or they may have the polarization property over a narrow range of wavelengths. A group of dichroic material is called pleochroic dyes. A pleochroic dye molecule has varying absorption depending on the orientation of the electric field of the incident light. Some pleochroic dyes are self-orienting when placed on a suitable substrate, whereas others have to be combined with other materials to produce the polarizing effect.

As taught by U.S. Pat. No. 2,400,877, an oriented dichroic dye layer may be formed by depositing the dye onto a surface that has been gently brushed or rubbed in a single direction. This patent reference also discloses that, by stretching a polymeric film, such as cellulose and derivatives thereof, proper orienting force may be obtained for dichroic dyes deposited thereon.

Light polarizing articles, such as polarizing ophthalmic lenses, have been manufactured by using various technologies and materials. Most of these products comprise a light polarizing layer in addition to a non-polarizing substrate. The polarizing layer is mostly formed from a dichroic material mentioned above. The light polarizing products hitherto produced and processes for the manufacture thereof have suffered from various drawbacks.

One problem of the prior art product is the distortion of the optical surface by the polarizing layer in the final product. Some of the light polarizing articles in the prior art are produced by laminating a pre-formed polarizing layer to a substrate. It is difficult, if not impossible, to allow the pre-formed polarizing layer to curve to a perfect fit with a contoured surface of the substrate, as is in the case of ophthalmic products. The less than perfect fit between the polarizing layer and the substrate can lead to undesired cylindrical power in an ophthalmic lens.

A second problem of the prior art process and products is delamination of the polarizing layer from the substrate during the manufacture process or during the life of the product. This is caused by, for example, (i) a less sufficient adhesion between the substrate and the polarizing layer; and/or (ii) stress between the layers having differing properties, especially differing thermal expansion coefficient.

Still another problem of the prior art polarizing product and processes for making them involves the leaching of substrate component into the polarizing layer. The leaching, or migration, can cause the deterioration of the mechanical and/or optical quality of the polarizing layer over time.

A fourth problem of the prior art article and process is the hazing of the article. Various causes contribute to this problem. The propagation and expansion of defects, optical and mechanical, originally on a micro-scale, is believed to be the leading culprit.

A fifth problem of the prior art article and process is the delamination between the polarizing dye layer and any additional coating applied over it, such as scratch-resistant coatings, hard coatings, water-repellant coatings, and the like.

European patent application publication No. 1674898 discloses a process for making polarizing articles. By depositing an inorganic adhesion-promoting layer between the lens substrate and the light polarizing dye layer, the invention disclosed therein solved the problem of poor adhesion between the substrate and the light polarizing dye layer.

Nonetheless, the issue of poor adhesion between the polarizing dye layer and the additional top layers remains to be solved. It has been found that adhesion between the polarizing dye layer and the additional functional layers, such as a hardcoat layer, can decrease during the life of the polarizing article over time on exposure to environmental factors, such as water, sweat, light, heat, and the like. Undesired premature delamination between these two layers may occur.

Consequently there is a genuine need for a polarizing article overcoming one or more drawback of the prior art and a process for making such articles.

SUMMARY

According to a first aspect of the present invention, there is provided a light polarizing article comprising a substrate, a first functional layer (i) comprising a plurality of polarizing dye molecules bearing ionic groups thereon, a second functional layer (ii) differing from the first functional layer, characterized in that, between the first functional layer and the second functional layer and abutting the first functional layer, there exists a first coupling layer (iii) comprising molecular structure bearing ionic groups having charges opposite to the polarizing dye molecules of the first functional layer, or groups capable of forming ions having charges opposite to the polarizing dye molecules of the first functional layer.

According to certain embodiments of the light polarizing article of the present invention, the second functional layer (ii) has a structure that is essentially free of ions. According to certain embodiments of the light polarizing article of the present invention, the second functional layer (ii) is a protective layer.

According to certain embodiments of the light polarizing article of the present invention, between the first coupling layer (iii) and the second functional layer (ii), there is a second coupling layer (iv) comprising polyepoxysilane abutting the first coupling layer (iii).

According to certain embodiments of the light polarizing article of the present invention, the second functional layer (ii) comprises a scratch-resistant sub-layer comprising a poly(meth)acrylate and/or a polysiloxane.

According to certain embodiments of the light polarizing article of the present invention, the polarizing dye molecules of the first functional layer have anionic groups, and the first coupling layer (iii) comprises a molecular structure having cationic groups.

According to certain embodiments of the light polarizing article of the present invention, the polarizing dye molecules of the first functional layer have anionic groups, and the first coupling layer (iii) comprises a molecular structure having at least one protonated amine group or quaternary amine group.

According to certain embodiments of the light polarizing article of the present invention, the polarizing dye molecules of the first functional layer have anionic groups, and the first coupling layer (iii) comprises a molecular structure having at least one primary, secondary or tertiary amine group.

According to certain embodiments of the light polarizing article of the present invention, at least part of the polarizing dye molecules of the first functional layer include a sulphonic group.

According to certain embodiments of the light polarizing article of the present invention, the first coupling layer (iii) comprises linear or cross-linked polysiloxane. In certain embodiments, the polysiloxane comprises one or more of the following structure units and/or protonated derivatives thereof:

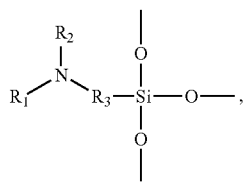
(a)

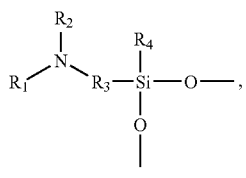
(b)

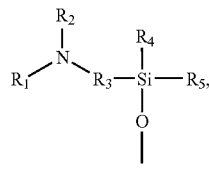
(c)

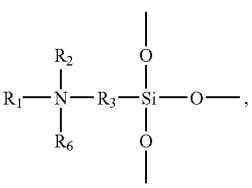
(d)

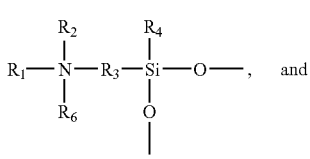
(e)

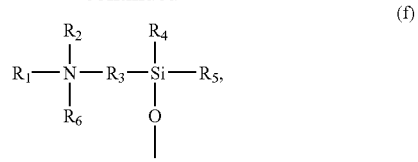
(f)

wherein:

$R_1$, independently and at each occurrence, is selected from hydrogen, substituted and unsubstituted C1-C6 alkyl, substituted and unsubstituted C3-C7 cycloalkyl, substituted and unsubstituted phenyl,

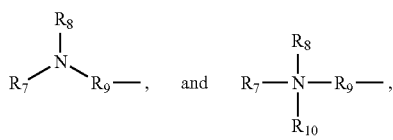

where $R_7$, $R_8$ and $R_{10}$, independently and at each occurrence, are selected from substituted and unsubstituted C1-C6 alkyl, substituted and unsubstituted C3-C7 cycloalkyl, and substituted and unsubstituted phenyl, and $R_9$, independently and at each occurrence, is selected from substituted and unsubstituted C1-C6 alkylene, substituted and unsubstituted phenylene, and substituted and unsubstituted oxyalkylene, $R_2$, independently and at each occurrence, is selected from hydrogen, substituted and unsubstituted C1-C6 alkyl, substituted and unsubstituted C3-C7 cycloalkyl, and substituted and unsubstituted phenyl, $R_3$, independently and at each occurrence, is selected from substituted and unsubstituted C1-C6 alkylene, $R_4$ and $R_5$, independently and at each occurrence, are selected from substituted and unsubstituted C1-C6 alkyl, substituted and unsubstituted C1-C7 cycloalkyl, and substituted and unsubstituted phenyl, and $R_6$, independently and at each occurrence, is selected from substituted and unsubstituted C1-C6 alkyl, substituted and unsubstituted C1-C7 cycloalkyl, and substituted and unsubstituted phenyl.

According to certain embodiments of the light polarizing article of the present invention, the polysiloxane in the first coupling layer (iii) is at least partly cross-linked.

According to certain embodiments of the light polarizing article of the present invention, the polysiloxane is selected from polymers of: γ-aminopropyltrimethoxysilane; γ-aminopropyltriethoxysilane; N-β-(aminoethyl)-γ-aminopropyltrimethoxysilane; N-β-(aminoethyl)-γ-aminopropyltriethoxysilane; and mixtures and combinations thereof.

According to certain embodiments of the light polarizing article of the present invention, the first coupling layer has a thickness of less than 1 μm, in certain embodiments from 5 nm to 500 nm, in certain other embodiments from 5 nm to 200 nm, in certain other embodiments from 5 nm to 100 nm, and in certain other embodiments from 5 nm to 50 nm.

According to certain embodiments of the light polarizing article of the present invention, the light polarizing article comprises:

(I) a light transmitting substrate;
(II) a light polarizing dye layer formed over at least part of one surface of the substrate, the layer comprising a plurality of dye molecules bearing anions thereon;

(III) a first coupling layer over and abutting the light polarizing dye layer, comprising polysiloxane the structure of which includes a protonated or unprotonated primary amine group, a protonated or unprotonated secondary amine group, a protonated or unprotonated tertiary amine group, a quaternary amine group, or combinations thereof; and (IV) a scratch-resistant layer comprising a poly(meth)acrylate and/or a polysiloxane.

According to certain embodiments of the light polarizing article of the present invention, the polarizing dye molecules are aligned substantially in parallel to each other.

According to certain embodiments of the light polarizing article of the present invention, at least part of the polarizing dye molecules are situated within microgrooves.

According to certain embodiments of the light polarizing article of the present invention, at least part of the polarizing dye molecules are situated on the surface of an adhesion layer consisting essentially of inorganic material. According to certain embodiments, the adhesion layer consists essentially of an oxide of silicon, metal oxide, or compatible mixtures or combinations thereof. According to certain embodiments, the adhesion layer consists essentially of a material selected from the group consisting of oxides of Si, Al, Zr, Ti, Ge, Sn, In, Zn, Sb, Ta, Nb, V, Y, mixtures thereof, and combinations thereof. According to certain embodiments, the adhesion layer consists essentially of SiO and/or $SiO_2$.

According to certain embodiments of the light polarizing article of the present invention, between the substrate and the inorganic adhesion layer, there exists at least one inorganic sub-layer promoting the adhesion between the adhesion layer and the substrate, the inorganic sub-layer being different from the inorganic adhesion layer in composition.

According to certain embodiments of the light polarizing article of the present invention, the inorganic sub-layer comprises silicon, an elemental metal, an oxide of silicon, or a metal oxide.

According to certain embodiments of the light polarizing article of the present invention, the at least one inorganic sub-layer consists essentially of chromium metal or SiO.

According to certain embodiments of the light polarizing article of the present invention, the substrate comprises at least one hard coat layer over which the inorganic adhesion layer is located.

According to certain embodiments of the light polarizing article of the present invention, the substrate is made of an organic polymer.

A second aspect of the present invention relates to a process for making light polarizing articles, the process comprising the following steps:

(A) providing a light transmitting substrate having at least one surface;

(C) forming a light polarizing layer over at least part of the surface of the substrate, said light polarizing layer comprising a plurality of polarizing dye molecules bearing ionic groups thereon;

(E) forming a protective layer over the light polarizing layer; characterized in that:
between steps (C) and (E), there is an additional step (D) as follows:

(D) forming a first coupling layer on the light polarizing layer, said first coupling layer comprising a molecular structure bearing ionic groups having charges opposite to the polarizing dye molecules of the light polarizing layer, or groups capable of forming ions having charges opposite to the polarizing dye molecules of the light polarizing layer.

According to certain embodiments of the process of the present invention, between steps (D) and (E), there is an additional step (DA) as follows:

(DA) forming a second coupling layer on the first coupling layer, the second coupling layer comprising a structure essentially free of ions.

According to certain embodiments of the process of the present invention, in step (DA), the second coupling layer comprises polysiloxane.

According to certain embodiments of the process of the present invention, in step (DA), the second coupling layer comprises polyepoxysilane. In certain embodiments, the second coupling layer comprises polyepoxysilane, and the second functional layer (ii) comprises poly(meth)acrylate and/or polysiloxane.

According to certain embodiments of the process of the present invention, the polarizing dye molecules of the light polarizing layer include anionic groups, and the first coupling layer comprises molecular structure having cationic groups.

According to certain embodiments of the process of the present invention, the polarizing dye molecules of the light polarizing layer include anionic groups, and the first coupling layer comprises molecular structure having at least one protonated amine group or quaternary amine group.

According to certain embodiments of the process of the present invention, the polarizing dye molecules of the light polarizing layer include anionic groups, and the first coupling layer comprises molecular structure having at least one primary, secondary or tertiary amine group or protonated derivatives thereof.

According to certain embodiments of the process of the present invention, at least part of the polarizing dye molecules of the light polarizing layer comprise a sulphonic group.

According to certain embodiments of the process of the present invention, the first coupling layer comprises linear or cross-linked polysiloxane.

According to certain embodiments of the process of the present invention, the polysiloxane comprises one or more of the interconnected structure units (a), (b), (c), (d), (e) and (f) described summarily above.

According to certain embodiments of the process of the present invention, the polysiloxane is selected from polymers of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, and mixtures and combinations thereof.

According to certain embodiments of the process of the present invention, the first coupling layer has a thickness of less than 1 μm, in certain embodiments from 5 nm to 500 nm, in certain other embodiments from 5 nm to 200 nm, in certain other embodiments from 5 nm to 100 nm, and in certain other embodiments from 5 nm to 50 nm.

According to certain embodiments of the process of the present invention, the polysiloxane is formed by polymerization of a corresponding siloxane in aqueous medium coated onto the surface of the light polarizing layer.

According to certain embodiments of the process of the present invention, between steps (A) and (C), there is a step (B) as follows:

(B) depositing an inorganic intermediate adhesion layer on the surface of the substrate, wherein said inorganic intermediate adhesion layer abuts the polarizing layer after step (C); and step (C) comprises the following steps (C1) and (C2):

(C1) forming a plurality of substantially parallel microgrooves on the surface farther from the substrate of the inorganic adhesion layer deposited in step (B); and (C2) depositing a light polarizing layer comprising polarizing dye molecules over and abutting the micro-grooves formed in step (C1).

According to certain embodiments of the process of the present invention, it comprises an additional step (A1) after step (A) as follows:

(A1) forming at least one adhesion-promoting inorganic sub-layer different from the inorganic adhesion layer between the substrate and the inorganic adhesion layer; wherein in step (B), the inorganic intermediate adhesion layer is formed directly over and abuts an inorganic sub-layer formed in step (A1).

According to certain embodiments of the process of the present invention, in step (B), the intermediate adhesion layer is formed from an oxide of silicon, a metal oxide, or a compatible mixture or combination thereof.

According to certain embodiments of the process of the present invention, in step (B), the adhesion layer is formed from a material selected from the group consisting of oxides of Si, Al, Zr, Ti, Ge, Sn, In, Zn, Sb, Ta, Nb, V, Y, La, and mixtures and combinations thereof.

According to certain embodiments of the process of the present invention, the at least one inorganic sub-layer is formed of silicon, an elemental metal, an oxide of silicon, or an oxide of a metal.

According to certain embodiments of the process of the present invention, the at least one inorganic sub-layer is formed of chromium metal or SiO.

According to certain embodiments of the process of the present invention, in step (i), the substrate provided comprises at least one hardcoat, and step (B) is performed over the hardcoat.

According to certain embodiments of the process of the present invention, in step (i), the substrate provided comprises an organic polymer or an inorganic glass material.

Embodiments of the light polarizing article of the present invention has the advantages of strong adhesion between the polarizing dye layer and any additional functional layer, such as protective layers, due to the presence of the first coupling layer. The light polarizing articles thus could be made with strong resistance to water, sweat, high humidity, and other deleterious use conditions. Moreover, the lens making process can be conducted in a small-scale lab, such as a typical ophthalmic lab, with desired results.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Figure 1:
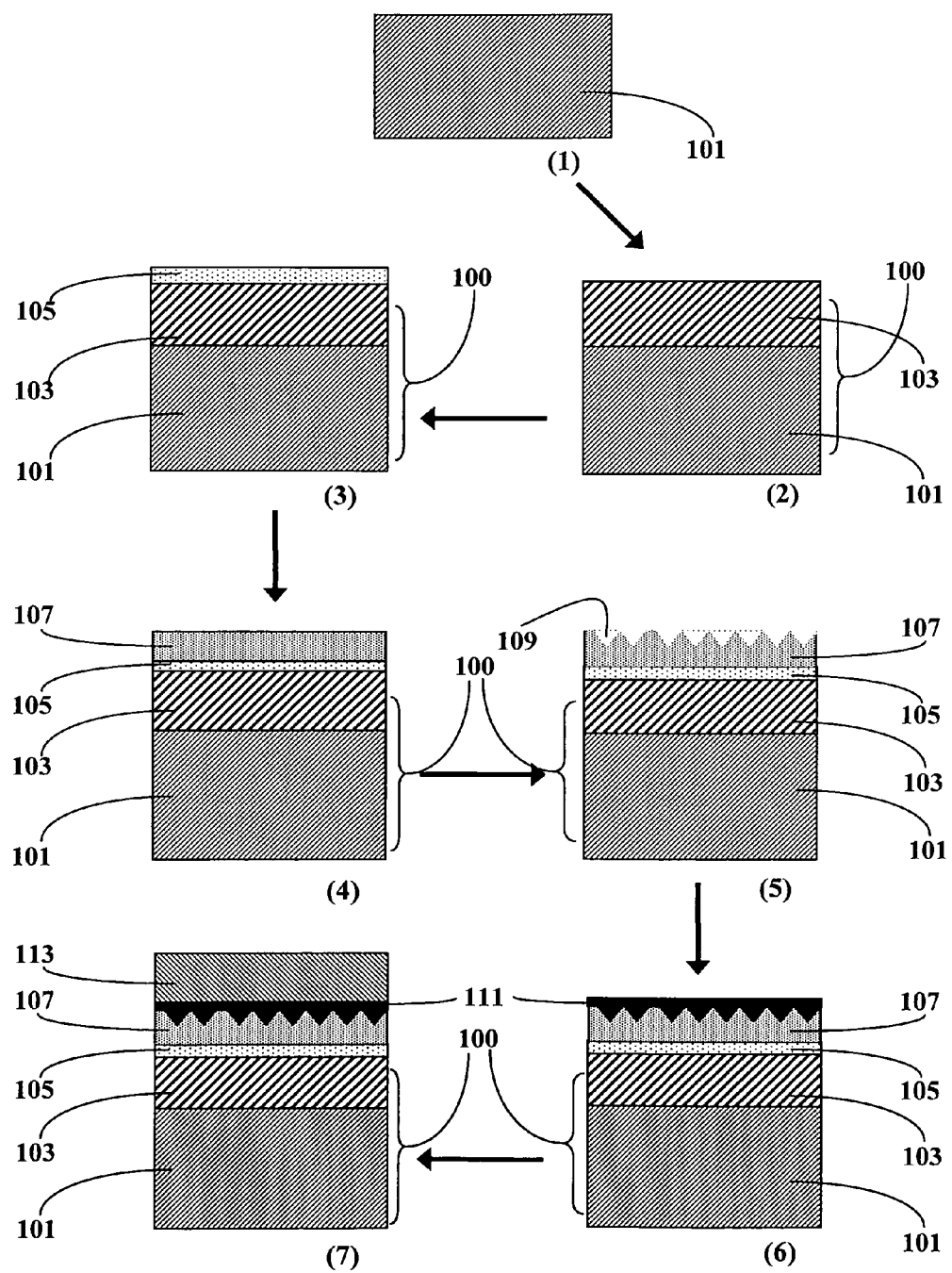
FIG. 1 is a schematic illustration of the structure and manufacture process thereof of an embodiment of a light polarizing article as disclosed in European Patent Application Publication No. 1674898.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, "ophthalmic product" means any semi-finished and finished, powered and non-powered, tinted and non-tinted, photochromic and non-photochromic, inorganic glass-based and polymer-based eyewear products, including sun-glass products and prescription eye-wear products, and blanks thereof; goggles; visors; and the like.

Unless otherwise specified, the term "oxide" as used herein in the present application includes stoichiometric oxides, oxygen deficient oxides and oxygen excess or rich oxides. For example, the term oxide of silicon or silicon oxide in the present application means a material having the exact formula $SiO_x$, where x may be larger than 2 (oxygen excess) or smaller than 2 (oxygen deficient). However, $SiO_2$ means a stoichiometric oxide in which the molar ratio of Si and oxygen atoms is 1:2. For the purpose of the present application, the formula SiO means oxygen deficient silicon oxide $SiO_y$, where $0.5 \leq y \leq 1.8$, in certain embodiments $0.5 \leq y \leq 1.5$. For another example, the oxide of aluminum or aluminum oxide in the present application means a material having the exact chemical formula $Al_2O_z$, where z may be larger than 3 (oxygen excess) or smaller than 3 (oxygen deficient). Thus silicon or the metal in the oxides may be at various valences, and not just the usual valences. Chemical vapor deposition can be used to produce oxygen deficient or oxygen excess oxides of silicon and/or metals.

"Polysiloxane" as used herein in the present application are polymer materials having a backbone structure comprising —O—Si—O—Si— linkages and organic groups, including linear and crosslinked polymers of siloxanes. U.S. Pat. No. 4,981,530 describes various types of cross-linked polysiloxane that can be used in the present invention. Polysiloxanes and preparation thereof are further described in, e.g., "Silicones", Volume 15, p. 204-308, Encyclopedia of Polymer Science and Engineering, Bruce Hardman, Arnold Torkelson from the General Electric Company. One of ordinary skill in the art understands that polysiloxanes can be prepared from, e.g., various siloxanes and/or silanes by various methods including, but not limited to, hydrolysis and polycondensation in aqueous media, with or without the use of basic or acidic catalysts. One skilled in the art also understands that a layer of polysiloxane can be formed by coating a substrate with a dispersion of polysiloxane in liquid media (especially aqueous media), with or without additional heat treatment of the coated material. Coating can be effected by dipping, impregnation, spin coating, and the like.

"C1-C6 alkyl" means a straight or branched saturated hydrocarbon chain having from 1 to 6 carbon atoms. Example C1-C6 alkyl groups include methyl, ethyl, propyl, isopropyl, butyl, sec-butyl, tert-butyl, pentyl and hexyl.

"C3-C7 cycloalkyl" means a cyclic saturated hydrocarbon ring having from 3 to 7 ring carbon atoms. Example C3-C7 cycloalkyl groups include cyclopentane, cycloheptane, and cyclohexane.

"C1-C6 alkylene" means a straight or branched saturated hydrocarbon chain divalent radical having from 1 to 6 carbon atoms. Example C1-C6 alkylene groups include methylene, ethylene, propylene, and butylene.

Where the relevant groups or radicals in the present application are substituted, they may be substituted by, for example, but not limited to, an alkyl, a halogen, a epoxy, a (meth)acryloxy, alkoxy, an hydroxyl, and the like, as appropriate.

The term "(meth)acrylate" is intended to mean acrylate, methacrylate and combination or mixture thereof.

European Patent Application Publication No. 1674898 discloses a light polarizing article comprising an adhesion layer between the substrate of the article and the light polarizing layer. By including such an adhesion layer, the durability of the light polarizing article was significantly improved.

Typically, in order to obtain a light polarizing article for ophthalmic uses, and for many other uses, a second functional layer is needed over the light polarizing layer, to impart desired physical and chemical properties to the final article. Such desired physical and chemical properties include: scratch resistance, water and/or stain-repelling properties, anti-fog properties, anti-reflective properties, and special tint or light filtering properties. Adhesion between such second functional layer and the polarizing layer, if such second layer is directly over and abutting the polarizing layer, is desired to be high throughout the life cycle of the article.

However, the present inventors have found that the adhesion of polarizing dye layer and traditional anti-scratch coating materials is not as good as desired. It has been found that prolonged exposure to light, high temperature, high humidity, water, saline, sweat, and combinations thereof, can weaken the bonding between the polarizing layer and the second functional layer.

While not intending to be bound by a particular theory, the present inventors believe that it is due to the ionic nature of the structure of the polarizing dye molecule and the non-ionic nature of the typical second functional layers or intermediate layers. The polarizing dye molecules as used typically comprise ions on their molecular structures. Such ions, without being paired to immobilized counter-ions, can attract moisture and water during the life cycle in damp or wet conditions, causing erosion of the interface between the polarizing dye layer and the second functional layer.

Accordingly, the present inventors have made this invention to solve the problem of inadequate durability of the adhesion between the polarizing dye layer and the second functional layer by introducing a layer of material having immobilized ions having charges or capable of forming immobilized ions having charges opposite to that of the polarizing dye molecules in the light polarizing layer. The immobilized counter-ions would pair at least partly with the ions born by the polarizing dye molecules. As such, water penetration into the interface between the polarizing dye layer and the second functional layer would be reduced, inhibited, or eliminated, thus the durability of the adhesion is improved.

The light polarizing article of the present invention, in general terms, comprises: a first functional layer (i) (i.e., a light polarizing layer) comprising a plurality of light polarizing molecules bearing ions thereon, and a second functional layer (ii) over the polarizing layer, wherein between the first functional layer and the second functional layer (i) and abutting the first functional layer (ii), there exists a first coupling layer (iii) comprising a molecular structure having ionic groups having charges opposite to the polarizing dye molecules of the first functional layer, or groups capable of forming ions having charges opposite to the polarizing dye molecules of the first functional layer. The article of the present invention may comprise a light transmitting substrate on which the various functional layers and coupling layers are formed. Between the substrate and the first functional layer, an optional inorganic adhesion layer may be present.

The light transmitting substrate may take various shapes before the formation of the various layers described above. The substrate has at least one surface, which may be planar or contoured. The substrate may be a planar sheet, a cylindrical blank having various thickness, or, for ophthalmic products, a blank having at least one contoured surface, such as one concave surface, or one convex surface, or a convex and a concave surface. The inorganic adhesion layer, the first functional layer, the first coupling layer, and the second functional layer are formed over at least part of the surface. It is not excluded that the substrate has more than one surface, and the various layers, if present, are formed over more than one of those surfaces. For example, the substrate may have two surfaces substantially parallel to each other, or substantially opposite to each other, and the inorganic adhesion layer and the polarizing layer are deposited over both surfaces. The polarizing direction of the two polarizing layers thus formed over the two surfaces may be chosen to be parallel or orthogonal to each other, or form a certain angle therebetween, depending on the use of the light polarizing article of the present invention. Particularly, for an ophthalmic lens blank, it is desired that the side that will not be further processed downstream is allowed to form the polarizing layer thereon. For a prescription lens blank, that side usually is the concave side. For finished products, such as stock ophthalmic lenses and planar sun-glasses, the polarizing layer may be formed on either side, since usually no further surface grinding of the lens is required afterwards.

The light transmitting substrate may have a main body made of inorganic glass or organic polymer, for example. As examples of such inorganic glass, mention can be made of typical alkaline earth aluminosilicate glasses, boroaluminosilicate (Pyrex®) glasses, doped and undoped fused silica glasses, transparent glass-ceramic materials, and crystalline materials, such as $CaF_2$, $MgF_2$, and the like. Particularly, for ophthalmic products, inorganic glass materials of special interest are those described in, for example, U.S. Pat. Nos. 4,839,314; 4,404,290 and 4,540,672. High refractive index inorganic glass materials disclosed in, for example, U.S. Pat. Nos. 4,742,028 and 6,121,176 are especially preferred.

Many polymer materials have been used as the substrate material for optical articles, including ophthalmic products. Such polymers may be polyamides, polyesters, polyimides, polysulfones, polycarbonates, polyurethanes, polyurethane-ureas, polyolefins, phenol resins, epoxy resins, and the like. As non-limiting examples of organic polymer suitable for the light transmitting substrate, mention can be made of homopolymers and copolymers of polyol (allylcarbonate) monomers such as the diethylene glycol bis(allyl carbonate) sold under the trademark CR-39® by PPG Optical Products, homopolymers and copolymers of mono or poly-functional (meth)acrylate, cellulose acetate, cellulose triacetate, cellulose acetate butyrate, cellulose acetate propionate, polyvinyl (acetate), poly(vinyl alcohol), poly(vinyl chloride), polyurethanes, polyurethane-urea such as TRIVEX™ or NXT® sold by PPG Optical Products and Intercast Europe Spa, respectively, poly(thiourethanes), polyamides, polycarbonates such as those derived from bisphenol-A and phosgene sold under the trade mark LEXAN®, polyesters such as poly(ethylene terephtalate), polystyrene, copolymers of styrene and methyl methacrylate or acrylonitrile, cyclic polyolefin copolymers (COC), amorphous polyolefin such as Zeonex® from ZEON Corp, and the like.

The main body of the light transmitting substrate may be photochromic or non-photochromic. Non-limiting examples of photochromic inorganic glass materials and preparation thereof are disclosed, for example, in U.S. Pat. Nos. 5,426,077 and 5,023,209. Non-limiting examples of photochromic polymer materials and preparation thereof are disclosed, for example, in U.S. Pat. Nos. 6,248,285 and 6,329,482.

The main body of the light transmitting substrate may be colored or colorless. Colored inorganic glass materials and method of making the same are described extensively in the art. Colored polymer materials may be produced by adding, for example, various organic dyes into the monomer before polymerization, or by impregnating the polymer matrix using organic dyes.

The light transmitting substrate may comprise, in addition to the main body, various layers of various types of surface coatings. For example, the substrate may include a anti-reflective coating, a hardcoat typical for ophthalmic products, a photochromic coating, a tinted color coating, a UV filtering coating, an infrared absorbing coating, and the like. One skilled in the art is familiar with these coatings, especially in connection with ophthalmic products. The functional layers according to the present invention may be formed over these surface coatings, or may be formed over a surface different from or opposite to the surface on which these coatings were formed.

The light polarizing layer (e.g., first functional layer) is typically formed over at least part of at least one surface of the light transmitting substrate. It imparts, at least partly, the light polarizing property of the polarizing article of the present invention. The polarizing layer may comprise at least one dichroic dye as the active ingredient. The dichroic dye molecules are oriented such that they impart the desired polarizing effect to the article of the present invention. However, in addition to the dichroic dye, the polarizing layer may further comprise other ingredients, such as adhesion promoting agents, plasticizers, non-polarizing dyes, and surfactants, for imparting a desirable color or hue to the end product, and the like, as long as these other ingredients (i) do not significantly negatively impact the adhesion of the polarizing layer to the other layers in the structure of the article, and (ii) do not significantly negatively impact the polarizing effect of the dichroic dyes in the layer.

Many different dichroic dyes are known and indeed were used in the manufacture of light polarizing products in the prior art. References mentioning such dichroic dyes include, for example, U.S. Pat. No. 2,400,877 and WO 00/22463. A single dichroic dye may be used in the polarizing layer to impart the polarizing effect as well as a desired color or tint, such as grey, to the end polarizing product. However, it is not excluded that a combination of various dichroic dyes may be used in the polarizing layer. Indeed, it is known to one skilled in that that various dichroic dyes having colors ranging from red, yellow to blue, may be used alone or in combination at various proportions to impart the desired polarizing effect and color to the final product.

It is also known in the art that dye molecules that absorb light at desired wavelength, but are incapable of forming ordered or polarizing structures in and of themselves may form a light polarizing structure when used together with suitable host materials, such as liquid crystal compounds. Such guest-host polarizing phenomenon and structures are described in, e.g., WO 00/22463, and other references. This effect has been used for the production of liquid crystal displays. This type of polarizing layer can certainly be used for the light polarizing article of the present invention. One of the contemplated uses of the light polarizing article of the present invention is in liquid crystal displays. For the purpose of the present invention, the term "light polarizing dye" includes both dyes which can orient themselves to provide polarizing effect, and dyes which cannot orient themselves to provide polarizing effect, but can provide polarizing effect when placed in a proper host or in combination with other materials.

At least a part of the polarizing dye molecules used in the present invention comprise ions on the molecule structure. Those dye molecules are typically organic compounds having color-imparting groups. If the chains of the molecules are aligned in a certain direction by various means, such as by mechanical, electrical or magnetic means, the matrix of the molecules can preferentially allow light having an electrical field oriented in a given direction to pass, hence the polarizing effect. The ions born by the polarizing molecules can be anions or cationic groups. In certain preferred embodiments, the polarizing dye molecules includes anions. Those anion-containing dye molecules can be water-soluble when paired with a certain cation to form a water-soluble salt and, upon deposition to a surface, rendered water-insoluble by ion-exchange into a water-insoluble salt of another ion. For example, certain polarizing dye molecules are water-soluble when paired with $Na^+$ or $K^+$ ions, but once exchanged in $Al^{3+}$, $Ca^{2+}$ and/or $Mg^{2+}$-containing aqueous solutions, they precipitate in the form of water-insoluble salts. The light polarizing dye layer in the light polarizing article of the present invention can be formed in this manner.

In certain embodiments of the light polarizing article of the present invention, the first functional layer desirably comprises a stabilizing component that at least partly immobilizes the light polarizing dye molecules. The stabilizing component may or may not impart color or polarizing properties to the article. For example, where polarizing dye molecules bearing anions are used, a polysiloxane can be included in the light polarizing layer. Properly cured polysiloxane, such as polyaminosiloxane and/or polyepoxysiloxane, have long polymer chains and/or cross-linked networks that can partly immobilize the polarizing dye molecules. The present inventors have found that certain anion-bearing polarizing dyes, when in the form of $Al^{3+}$, $Mg^{2+}$ and $Ca^{2+}$ salt, have very low solubility in water at low temperature (such as around 0° C.). However, at higher temperature, such as around 100° C., or even under hot sun, prolonged exposure to humidity and/or liquid water (such as sweat) can mobilize a significant portion of the polarizing dye molecules if they are not secured by a polymer chain or molecule, causing reduction of polarization efficiency, haze, or even delamination. With additional polysiloxane polymer additives present in the first functional layer, the movement of the polarizing dye molecules can be significantly reduced, thus significantly enhancing the hot-water and sweat resistance of the polarizing dye layer.

It has been found that, surprisingly, it is desired in certain embodiments that the first functional layer is essentially a single layer, even if it comprises stabilizers such as polysiloxanes. By "essentially a single layer," it is meant that when viewed on the sub-µm scale, the light polarization dye molecules are essentially evenly distributed throughout the layer. For a high polarization efficiency, such as a polarization efficiency higher than 95%, in certain embodiments higher than 98%, it is desired that the light polarizing dye molecules are aligned in essentially the same direction.

Pre-fabricated light polarizing layers comprising dichroic dyes have been disclosed and used in the prior art before. Non-limiting examples of such polarizing layers include polarizing polyvinyl alcohol (PVA), polyethylene terephthalate (PET) films, and the like. Many of these films are stand-alone polarizing films produced by stretching the polymer film having a layer of dichroic dye deposited thereon or imbibed therein. Multiple-layer polarizing wafers have been developed in the prior art as well for laminating to a substrate to form a polarizing article such as sunglasses. These polarizing films and wafers may be used in the present invention polarizing articles as the light polarizing layer in accordance with the methods available in the prior art.

However, the use of pre-fabricated polarizing films and wafers can bring about undesired effects to the end product. Therefore, in the light polarizing article of the present invention, it is desired that the first functional layer is formed in situ over, e.g., an inorganic adhesion layer described in detail below, or a light-transmitting substrate. In certain embodiments, it is desired that the inorganic adhesion layer or the substrate surface comprises a plurality of microgrooves on the outer side (the side farther from the substrate), and the first functional layer is deposited in and over the microgrooves. In certain embodiments, it is desired that the microgrooves are substantially parallel to each other. The microgrooves are desired to have a sub-micron size in certain embodiments. That is, the width and depth of the grooves are desired to be less than 1 μm. The grooves serve to provide orientation of the polarizing dye molecules in the polarizing layer, according to the teaching of U.S. Pat. No. 2,400,877. Preferably, the polarizing layer comprises at least one dichroic dye capable of orienting themselves in the presence of microgrooves to provide light polarizing effect. Such structure of polarizing dye on microgrooves was disclosed in FR 03 12686 and European patent application publication No. 1674898, and is particularly advantageous for the present invention. The structure is simple, easy to produce, and is capable of providing consistent polarizing effect across the surface without distorting the light manipulating power of the final article. In this structure, the polarizing dye molecules are desired to be stably confined in their local position under the normal use condition during the life cycle of the article. Compared to polarizing films and wafers, they are less likely to lose their orientation due to heat and other conditions. In other words, compared to prior art polarizing articles employing polarizing films and/or wafers, certain embodiments of the light polarizing article of the present invention can be made to have higher thermal stability.

The light polarizing article of the present invention also comprises a second functional layer. The second functional layer can be, for example, a hard-coat layer (or anti-scratching layer), a water-resistant layer (anti-fogging layer), an anti-reflective layer, a UV-absorbing layer, an IR-absorbing layer, a photochromic coating layer, and the like, and combinations thereof. The second functional layer may be based on various materials, such as organic polymers (e.g., poly(meth) acrylates, polyamides, polyimides, polyesters, polysulphones, polyurethanes, polyurethane-urea, and the like), polysiloxanes (e.g., polyepoxysiloxanes, polyethoxysilanes, polymethoxysilanes, and the like), inorganic materials (such as multiple layers of oxides of various metals for imparting the anti-reflective property to the article). The second functional layer may be further tinted. The second functional layer differs from the first functional layer in terms of, e.g., structure and/or composition.

As indicated above, the adhesion between the first functional layer and the second functional layer, absent a coupling layer (iii) of the polarizing article of the present invention, tends to be insufficient, even if a stabilizer is included into the first functional layer to immobilize the polarizing dye molecules. It has been found by the present inventors that, upon exposure to high temperature and high humidity, or to artificial sweat or real sweat in simulated or real use conditions, polarizing articles without a coupling layer between the first functional layer and the second functional layer, especially when the second functional layer is based on organic polymer materials, such as poly(meth)acrylates and/or polysiloxanes, the bonding between the first functional layer and the second functional layer tends to weaken.

Surprisingly, the present inventors have found that, by including a coupling layer between the surfaces of the first functional layer and the second functional layer of the present invention, the adhesion between the first and second functional layers and durability thereof can be significantly improved without sacrificing other desired properties of the article, such as polarization efficiency and the desired function of the second functional layer. The first coupling layer (iii) in the light polarizing article of the present invention has a structure that includes ionic groups having charges opposite to that of the polarizing dye molecules of the first functional layer, or groups capable of forming ions having charges opposite to that of the polarizing dye molecules of the first functional layer under use conditions. While intending to be bound by any particular theory, it is believed by the present inventors that the counter-ions present on the structure of the first coupling layer can pair with the ions present on the polarizing dye molecules in the first functional layer, form strong ionic bonds, further immobilize the polarizing dye molecules, and enhance the bonding between the first functional layer and the first coupling layer (iii). The first coupling layer is desired to have certain structural units having physical properties similar to those of the second functional layer to allow a strong bonding between the first coupling layer (iii) and the second functional layer (ii). In certain embodiments, it is even desired that: (a) the first coupling layer have a structure that includes groups that can react with the materials of the second functional layer (ii) to form strong and durable chemical bonds; or (b) the first coupling layer have structure that includes groups capable of forming hydrogen bonds with the materials of the second functional layer (ii), such that there is a strong and durable adhesion between the first coupling layer (iii) and the second functional layer.

Thus, for example, where the polarizing dye molecules of the first functional layer (i) of the light polarizing article of the present invention include anions, such as $-SO_3^-$, $-COO^-$, and the like, it is desired that the first coupling layer (iii) comprises structure that includes cationic groups or groups that are capable of forming cationic groups under use conditions, and vice versa. In certain embodiments, the first coupling layer (iii) is desired to be a polysiloxane layer. Where the first coupling layer (iii) is desired to include cationic groups, it may comprise the following interconnected structural units or protonated derivatives thereof:

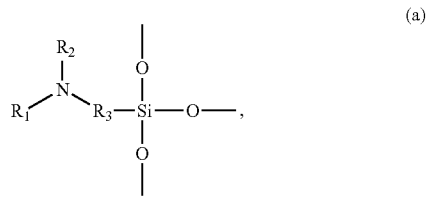

(a)

-continued (b) 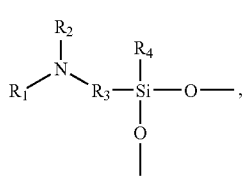

(c) 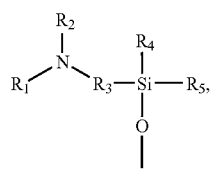

(d) 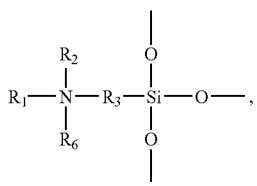

(e) 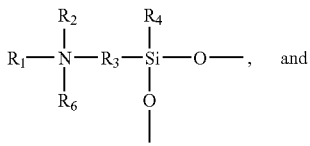

(f) 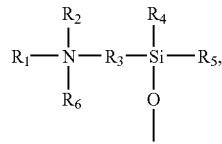

wherein:
$R_1$, independently and at each occurrence, is selected from hydrogen, substituted and unsubstituted C1-C6 alkyl, substituted and unsubstituted C3-C7 cycloalkyl, substituted and unsubstituted phenyl,

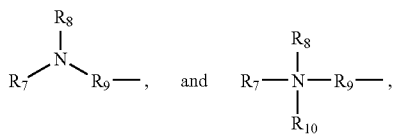

where $R_7$, $R_8$ and $R_{10}$, independently and at each occurrence, are selected from substituted and unsubstituted C1-C6 alkyl, substituted and unsubstituted C3-C7 cycloalkyl and substituted and unsubstituted phenyl, and $R_9$, independently and at each occurrence, is selected from substituted and unsubstituted C1-C6 alkylene, substituted and unsubstituted phenylene, and substituted and unsubstituted oxyalkylene, $R_2$, independently and at each occurrence, is selected from hydrogen, substituted and unsubstituted C1-C6 alkyl, substituted and unsubstituted C3-C7 cycloalkyl and substituted and unsubstituted phenyl, $R_3$, independently and at each occurrence, is selected from substituted and unsubstituted C1-C6 alkylene, $R_4$ and $R_5$, independently and at each occurrence, are selected from substituted and unsubstituted C1-C6 alkyl, substituted and unsubstituted C1-C7 cycloalkyl and substituted and unsubstituted phenyl, and $R_6$, independently and at each occurrence, is selected from substituted and unsubstituted C1-C6 alkyl, substituted and unsubstituted C1-C7 cycloalkyl and substituted and unsubstituted phenyl.

The above structural units may be present in a linear or cross-linked overall structure at various locations in various fashion, e.g., repeatedly and serially (as repeating units), or as end units, or stand-alone structures in the middle of the network. The amine groups in the above structures are either cationic groups (in the case of quaternary amine group), or partly protonated under use conditions (i.e., when formed into a polarizing layer in a light-polarizing article). Without intending to be bound by any particular theory, the present inventors believe that the OH groups present in the polysiloxane structure can react with the primary amine groups, secondary amine groups, and tertiary groups to form corresponding protonated amine groups.

In certain embodiments, the first coupling layer (iii) comprises polymers of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, mixtures thereof, and combinations thereof.

The first coupling layer in the light polarizing article of the present invention desirably has a thickness of less than 1 μm, in certain embodiments from 5 nm to 500 nm, in certain other embodiments from 5 nm to 200 nm, in certain other embodiments from 5 nm to 100 nm, and in certain other embodiments from 5 nm and 50 nm.

In order to optimize the adhesion between the first coupling layer (iii) and the second functional layer in the light polarizing article of the present invention, it is desired, in certain embodiments, that a second coupling layer exist between the first coupling layer and the second functional layer. Such a second coupling layer can comprise, e.g., polyepoxysiloxane, poly(meth)acryloxysiloxane, and the like.

In the light polarizing article of the present invention, it is desired that at least one inorganic adhesion layer exists between the light-transmitting substrate and the first functional layer (the light polarizing layer). As described in European patent application publication No. 1674898, although the light polarizing dyes are organic in nature, their bonding to an inorganic adhesion layer, described in detail below and in European patent application publication No. 1674898, tends to be much stronger than to a polymer intermediate layer as disclosed in FR 03 12686. In addition, the inorganic adhesion layer, with the assistance of an optional inorganic sub-layer, tends to have a strong bonding with most substrate materials, including inorganic glass substrates and organic polymer substrates (which may comprise additional surface layers on which the inorganic adhesion layer and optional sub-layer are formed, as described below).

The inorganic adhesion layer is desired to be an oxide of silicon, a metal oxide or a compatible mixture and/or combination thereof. Desirably, the inorganic adhesion layer is formed by a material selected from the group consisting of SiO, $SiO_2$, $Al_2O_3$, $ZrO_2$, $TiO_2$, $GeO_2$, and mixtures and combinations thereof. In certain embodiments, the inorganic adhesion layer is formed of $SiO_2$. The present inventors have discovered that, the inorganic adhesion layer, especially $SiO_2$, can be formed with a strong bond with substrates made of inorganic glass materials and organic polymer materials, with or without additional surface coatings. Generally, the inorganic adhesion layer should have the light transmitting properties in the wavelength range in which the polarizing article is to be used. It is also contemplated that multiple layers of inorganic materials having differing compositions may be employed as the inorganic adhesion layer. Such multiple layer structure may be advantageously employed to reduce reflection at the interface between the inorganic adhesion layer and the substrate.

The thickness of the inorganic adhesion layer is on the microscopic scale. The thickness of the intermediate layer should be sufficient to allow the formation of the micro-grooves without revealing the substrate surface. Typically, the inorganic adhesion layer has a thickness less than 10 μm, in certain embodiments less than 5 μm, and in certain other embodiments less than 1 μm. Generally, for plasma deposition, the thinner the coating, the less time is required for the deposition thereof.

For certain substrates, in order to obtain a strong adhesion between the inorganic adhesion layer and the substrate material, it is desired to form a thin inorganic sub-layer between the inorganic adhesion layer and the substrate. The sub-layer has a composition differing from that of the inorganic adhesion layer. The sub-layer is typically formed of silicon, an elemental metal, a metal oxide, or an oxide of silicon. As non-limiting examples of elemental metals, mention can be made of chromium, molybdenum, nickel, titanium, iron and compatible combinations and/or mixtures thereof. As non-limiting examples of metal oxides, mention can be made of $Al_2O_3$, $ZrO_2$, $TiO_2$, $GeO_2$, and mixtures and combinations thereof. Silicon oxide may be SiO and/or $SiO_2$. In certain embodiments, desired sub-layer materials are chromium metal and SiO, especially for a $SiO_2$ intermediate layer.

The sub-layer is generally much thinner than the inorganic adhesion layer, and is usually on the nano-scale. Where the sub-layer is formed from an elemental metal, such as chromium, in order to ensure sufficient transmission, it is highly desired that the thickness thereof be very low. Typically, the sub-layer has a thickness of less than 300 nm, in certain embodiments less than 100 nm, and in certain other embodiments less than 20 nm. The inorganic sub-layer may be a single layer of atoms or molecules.

As non-limiting examples of a combination of the inorganic adhesion layer and the sub-layer, mention can be made of: (i) a sub-layer of SiO and a $SiO_2$ intermediate layer; and (ii) a sub-layer of chromium metal and a $SiO_2$ intermediate layer. The combination of SiO sub-layer and $SiO_2$ intermediate layer is believed to be particularly effective for substrates made of CR 39 (a thermosetting synthetic resin of diethylene glycol bisallyl carbonate) substrate. The monomer for this polymer has the following structure:

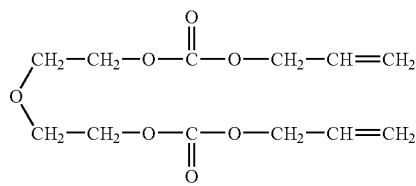

Various polarizing articles according to certain embodiments of the present invention can be produced to be used at wide spectra of wavelength, ranging from UV to visible light to infrared light. In certain embodiments, especially for the ophthalmic applications, the light polarizing article of the present invention is for use in the wavelength range of visible light.

The light polarizing article of the present invention may find application in many devices. Non-limiting examples of applications include: ophthalmic products; display products, particularly liquid crystal displays, including LCD monitors and LCD projectors; polarizing windows for vehicles, including land-based, airborne, and water-based vehicles; facemasks; shields; building glass; and the like.

In general terms, the process of the present invention for the production of light polarizing article comprises the following steps:

(A) providing a light transmitting substrate having at least one surface;

(C) forming a light polarizing layer over at least part of the surface of the substrate, the light polarizing layer comprising a plurality of polarizing dye molecules having ionic groups thereon;

(E) forming a protective layer over the light polarizing layer; characterized in that:

between steps (C) and (E), there is an additional step (D) as follows:

(D) forming a first coupling layer on the light polarizing layer, said first coupling layer comprising a molecular structure having ionic groups having charges opposite to those of the polarizing dye molecules of the light polarizing layer, or groups capable of forming ions having charges opposite to those of the polarizing dye molecules of the light polarizing layer.

As described in European Patent Application Publication No. 1674898, in order to obtain strong adhesion between the light transmitting substrate and the light polarizing layer, it is desired that between steps (A) and (C), there is a step (B) as follows:

(B) depositing an inorganic intermediate adhesion layer on the surface of the substrate, wherein the inorganic intermediate adhesion layer abuts the polarizing layer after step (C);

and step (C) comprises the following steps (C1) and (C2):

(C1) forming a plurality of substantially parallel micro-grooves on the surface of the inorganic adhesion layer deposited in step (B) farther from the substrate; and (C2) depositing a light polarizing layer comprising polarizing dye molecules over and abutting the micro-grooves formed in step (C1).

As discussed above, for certain substrate materials, it is desirable to add an inorganic sub-layer between the inorganic adhesion layer and the substrate in order to promote the adhesion between the inorganic adhesion layer and the substrate. Accordingly, those embodiments of the process of the present invention for the production of those articles further comprises an additional step (A1) after step (A) as follows:

(A1) forming at least one adhesion-promoting inorganic sub-layer different from the inorganic adhesion layer between the substrate and the inorganic adhesion layer;

wherein in step (B), the inorganic adhesion layer is formed directly over and abuts the inorganic sub-layer formed in step (A1).

In step (A), the substrate may have the structure and composition as discussed above in connection with the light polarizing article of the present invention. Generally speaking, such substrates may be surface polished, cleaned, and dried before step (A1), if present, and step (B). Various surface cleaning techniques may be used. Sometimes, in order to activate the surface for better adhering between the surface and the respective layers to be deposited, it is desirable to use plasma cleaning.

In addition, as part of step (A), a surface coating may be applied to the body of the substrate. Such surface coatings may include, for example, antireflective coatings, hardcoats, and the like. However, since the present invention has the advantage of being applicable to various types of substrate materials, deposition of those coatings are not compulsory. It is indeed oftentimes preferable not to form those base coatings in order to minimize the steps of production process. That said, the application of such additional surface coatings to the body of the substrate may be desirable for certain substrate materials, especially those made of organic polymer materials. In a totally non-limiting way, the surface coating may be notably based on silanes, e.g., alkoxysilanes and/or chlorosilanes or compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the above types, which are non-reactive with each other (e.g., isocyanate and vinyl). Particular examples of such surface coatings include coatings based on γ-aminopropyltrimethoxysilane, γ-aminopropyltriethoxysilane and epoxyalkyltrialkoxysilane.

Regarding steps (A1) and (B), the inorganic adhesion layer and the inorganic sub-layer may be obtained using a technique such as, e.g., chemical vapor deposition (CVD) processes, such as plasma enhanced chemical vapor deposition (PECVD), low pressure chemical vapor deposition (LPCVD), sub-atmospheric chemical vapor deposition (SACVD); plasma vapor deposition (PVD) processes, such as ion-assisted electron beam evaporation, non ion-assisted electron beam evaporation and sputtering; as well as sol-gel processes and the like.

Chemical vapor deposition (CVD) is a widely used materials-processing technology. A good reference book on CVD is *Chemical Vapor Deposition* (Eds. J-H Park et al.), *Surface Engineering Series*, Volume 2 (ASM International®, July 2001). The majority of CVD applications involve applying solid thin-film coatings to surfaces. Stated simply, CVD involves flowing a precursor gas or gases into a chamber containing one or more heated objects to be coated. Chemical reactions occur on and near the hot surfaces, resulting in the deposition of a thin film on the surface. By-products along with unreacted precursor gases are exhausted out of the chamber. PECVD, LPCVD and SACVD are only a few variants of CVD techniques. CVD can be carried out at a wide range of temperatures and pressures, with or without carrier gases. The majority of the elements in the periodic table have been deposited by CVD techniques, some in the form of the pure element, but more often combined with other elements to form compounds.

Among these CVD processes, PECVD is a preferred process for depositing the inorganic adhesion layer and the sub-layer, if present, in the process of the present invention. In a PECVD system, a RF source excites electrons in an electromagnetic field set up between a top electrode and a grounded substrate. The excited electrons collide with gas molecules to form ions/reactive neutrals or plasma. PECVD has several advantages over thermal CVD techniques. First, PECVD allows for a much lower deposition temperature and pressure. For example, the temperature for PECVD deposition of $Sio_2$ using $SiH_4$ and $O_2$ or $N_2O$ is typically from 200 to 400° C., in contrast to the 350-550° C. temperature required for thermal CVD. Second, by using a plasma, ion bombardment aids in making films denser, increases deposition rate, and promotes good film adhesion. Moreover, film uniformity in terms of microstructure and thickness can be achieved. Still another great advantage of PECVD is its ability in controlling residual film stress. By varying process parameters, the user can create films with compressive or tensile stress or without stress.

The plasma vapor deposition techniques do not involve a chemical reaction between the substrate surface and the material being deposited onto it. In the evaporation methods, the material to be deposited is heated in a vacuum until it boils or sublimes to become a gas. The gas is transported to the substrate, where it is cooled and condenses onto the substrate surface to form the deposited layer. In sputtering, the material to be deposited is literally thrown at the substrate at a high velocity. A wide variety of sputtering techniques have been developed. Thin films of many materials, including silicon dioxide, have been deposited using evaporation or sputtering techniques.

Sol-gel processes for thin film formation involve the coating of a sol-gel of the material being deposited onto the surface of the substrate, followed by drying and heat treatment to form a dense interconnected film of the deposited material. In the case of silica, for example, a sol-gel material can be created by hydrolysis (acidic or alkaline or in neutral pH) of alkoxysilanes. The thus formed colloidal sol-gel is coated onto the substrate surface, dried and heat treated below 300° C. to form a dense coating. A higher temperature heat treatment may be used to sinter the film for a higher densification, if permitted, for example, where the substrate is based on inorganic glass.

Spray pyrolysis is another option for depositing the inorganic adhesion layer and the optional sub-layer.

Whatever coating deposition process is used, it is desired that the coating deposition process does not adversely affect the composition and properties of the substrate. For example, if the substrate comprises organic polymer material that deforms or degrades at a high temperature, the deposition of the inorganic adhesion layer and the optional sub-layer must be conducted below a threshold temperature. It is desirable that the deposited coating have strong adhesion to the substrate and other coatings.

Thus, particularly preferred techniques are those based on ion assisted deposition (IAD), ion beam sputtering (IBS), and plasma ions assisted deposition (PIAD) because they operate at or near room temperature. IAD process for example produces coating with good physical properties but also can be applied to heat sensitive substrates such as plastics because of the low temperature involved. This process results in direct deposition of ionized vapor and in adding activation energy by the highly effective ion bombardment during the growing of the film. In PIAD, various materials are evaporated using electron guns in conjunction with a plasma source.

Another example of vacuum deposition is described in U.S. Pat. No. 4,130,672. Indeed this patent relates to a method capable of depositing silicon oxide SiO and silicon dioxide $SiO_2$ films on the surface of transparent optical material of glass or synthetic resin at low temperature (lower than 120°). This method utilizes the fact that silicon oxide is easily vacuum-deposited even at low temperature (100° C.). Using the appropriate conditions of vacuum-deposition, a durable coating comprising SiO and $SiO_2$ layers can be easily obtained. Moreover the coating obtained exhibits a pencil hardness of 6-7H, which is twice as large as that of synthetic substrates such as CR39® and therefore well suited to be grooved by means of an abrasive brushing.

Although SiO has good adhesion on plastic substrates even when directly deposited on the substrate at a high thickness it suffers optically undesirable absorption. Therefore SiO is used primarily for the purpose of ensuring adhesion of a thicker $SiO_2$ layer.

U.S. Pat. No. 5,597,622 mentioned that if an $SiO_2$ layer is applied directly, it adheres poorly to synthetic substrates. Such coating, if applied directly, becomes very rapidly detached in boiling water tests, for example, after 5 to 10 minutes. In contrast, if SiO is used as an adhesion layer between the substrate and the $SiO_2$ layer, the article passes the boiling test.

When SiO plus $SiO_2$ are used together, the relative thicknesses may need to be adjusted in order to avoid detrimental reflection effects.

Despite its undesirable absorption, SiO may be used as the inorganic adhesion layer, provided that the thickness is chosen in order to keep the absorption within a reasonable limit. Generally, the SiO layer has a thickness from one molecule up to 100 nm. Preferably, the thickness is up to 50 nm.

$SiO_2$ may be used in higher thicknesses, for example, up to 500 nm. We have found that an appropriate thickness for the article of the invention is 100 nm.

As mentioned above, the body of the substrate may be surface treated before the application of the inorganic adhesion layer and the optional inorganic sub-layer. For example, for certain plastic substrate materials, in order to obtain a good adhesion, it is also possible to form a silicone resin type curable hard layer on the surface prior to the deposition of the inorganic adhesion layer and the optional inorganic sub-layer. These silicone hard resins can be used as anti-scratch coatings, also referred to as hardcoats. Example of such a deposition of silicone resin layer prior to vapor deposition of $SiO_2$ is described in JP 58042001. We have found that silicone resin sold under the trade mark HI-GARD® 1080 from PPG Industries, Inc. is particularly suitable and provides an acceptable adhesion and a good transmittance.

Such a silicone resin layer may be also needed to ensure good resistance of the substrate to the highly energetic conditions that are involved when ion or plasma assisted techniques are used. A general rule is that lenses without a hardcoat may be coated with metal oxide layer without an ion assist, but substrates with hardcoats may be generally hard coated with an ion or plasma assist. This is particularly useful with synthetic substrates that have poor thermal stability.

Very thin metallic layers (such as chromium) can be used in order to obtain a higher adhesion of the oxide layer on the substrate. Indeed, oxides do not normally adhere strongly to plastics. Being a metal, this layer must be extremely thin to prevent a grey color. Typical adhesion metal sub-layer thicknesses are only a few nanometers.

Methods and equipment for forming microgrooves and deposition of the polarizing layer thereon have been disclosed in FR 03 12686, and U.S. Pat. Nos. 4,683,153 and 2,400,877.

The formation of micro-grooves on the surface of the inorganic adhesion layer is advantageously achieved by brushing the surface. As a non-limiting example, a spinning wheel made of foam material, such as polyurethane form, soaked with a slurry of abrasive particles, can be used for brushing the surface. The slurry of the abrasive particles may be a typical polishing slurry used in the art. The abrasive particles usually are on microscopic and sub-micron scale. The particles may be of, for example, $Al_2O_3$, $ZrO_2$, $TiO_2$, $CeO_2$, and the like, as long as they have higher hardness than the inorganic adhesion layer. Additives, such as viscosity modifying agents, may be added into the slurry as well. One of ordinary skill in the art can adjust the rotation speed of the brushing wheel, the pressure applied, and other process parameters, when brushing to obtain an optimum brushing result in an optimum brushing time.

Upon brushing of the intermediate layer, and prior to the deposition of the polarizing layer, the substrate is usually thoroughly cleaned and dried.

The formation of the polarizing layer in step (B) involves the coating of a solution or a suspension of polarizing dyes onto the surface of the inorganic adhesion layer, on which micro-grooves have already been formed. The solution or suspension is advantageously water-based. As mentioned above, in order to obtain the desired color and hue of the polarizing article, sometimes multiple polarizing dyes having differing colors are used at various proportions in the polarizing dye solution. Furthermore, the polarizing dye solution may comprise, in addition to the dyes pr se, additives. Those additives may include: (i) rheology modifiers; (ii) adhesion promoters; (iii) plasticizers; (iv) non-polarizing dyes, and the like. The deposition of the polarizing dye solution can be performed by using various coating techniques available in the art such as, for example, dip coating, flow coating, spin coating, spray coating, and the like, using conventional equipment.

After deposition of the dye solution over the microgrooves, it is often desirable to insolubilize and immobilize the polarizing dyes on the microgrooves. A preferred way to do so is to subject the coated substrate to an aqueous solution of a metal salt. U.S. Pat. No. 2,400,877 discloses methods and agents used for the insolubilization. As non-limiting examples of such metal salts, mention can be made of $AlCl_3$, $BaCl_2$, $CdCl_2$, $ZnCl_2$, $SnCl_2$, and the like. $AlCl_3$ and $ZnCl_2$ are preferred for their low toxicity. Salts other than chlorides may also be used. Generally, metal salts used in the textile industry for insolubilizing dyes in water can be used. For example, metal salts of Al, Fe, Cr, Ca, Mg, and the like, may be used. In addition, the material for insolubilizing the dye molecules may be a buffered solution or dispersion containing multiple acids, salts and/or bases of various metals. For example, one combination used for insolubilizing certain sulphonic group-containing polarizing molecules is an aqueous dispersion including: (i) $AlCl_3$; (ii) $Mg(OH)_2$; and (iii) $Ca(OH)_2$, at a pH of about 4. The result of such insolubilization by metal salts is the precipitation of the polarizing dye molecules in the form of salts having low solubility in water around room temperature.

However, as indicated above, such precipitated salts may still have an unacceptable solubility in water at a relatively high temperature, or may be mobilized after prolonged exposure to sweat and/or other water source. Thus, in certain embodiments, it is desired that the polarizing dye molecules be further immobilized by, e.g., polymer molecules distributed in the light polarizing layer. One category of polymers that can be used for this purpose is polysiloxane. According to certain embodiments, after the initial insolubilization of the polarizing dye molecules, the layer of polarizing dye molecules is impregnated with a dispersion of a siloxane or a prepolymer of at least one siloxane. It is generally desired that the siloxane or siloxane prepolymer is allowed to penetrate into and distribute throughout the light polarizing layer. In certain embodiments it is desired that the impregnation is at least 5 minutes, in certain embodiments at least 10 minutes, and in certain embodiments at least 15 minutes. Upon impregnation, it is desired in certain embodiments that the light polarizing layer is rinsed to avoid the formation of a separate layer of the siloxane and/or prepolymers thereof on the surface. Without intending to be bound by any particular theory, it is believed that this could avoid the disorientation of the polarizing dye molecules caused by the further polymerization of any separate layer of siloxane. Upon impregnation and rinsing, it is desired in certain embodiments that the light polarizing layer is subjected to mild heat treatment by which the siloxane and/or prepolymer thereof distributed within the light polarizing layer are allowed to polymerize and/or crosslink, forming a polymer matrix which traps the light polarizing dye molecules.

In order to obtain a high polarizing efficiency of the article, it is desired that the polarizing dyes, with or without the aid of additives such as liquid crystal polymers, align in a parallel matter, such as in the direction of the micro-grooves. It is desired that, in certain embodiments, that the light polarizing layer is essentially a single layer. This would allow for precise alignment of the polarizing dye molecules and thus a high polarization efficiency.

As discussed supra, in order to improve the adhesion and the durability thereof under use conditions between the light polarizing layer and the additional functional layer over it, such as protective coatings, the process of the present invention includes a step of forming a coupling layer between the light polarizing layer and the additional functional layer. The first coupling layer was found to be essential for improving adhesion between a light polarization layer comprising anion-containing polarizing dye molecules and protective coatings comprising polysiloxane and/or poly(meth)acrylates.

As discussed supra, the first coupling layer has a structure containing ionic groups having charges opposite those of the polarizing dye molecules of the light polarizing layer, or groups capable of forming ions having charges opposite those of the polarizing dye molecules of the light polarizing layer under use conditions. The counter-ions of the light polarizing dye molecules and the first coupling layer form strong bonds, improving the adhesion between the light polarizing layer and the first coupling layer. In addition, where the light polarizing layer comprises polymer insolubilizers, such as polysiloxane, the first coupling layer is desired to react with the polymer insolubilizers to form covalent bonds, thus building a network of molecular structure at the interface between the light polarizing layer and the first coupling layer, further enhancing the adhesion between the two layers, and immobilizing the polarizing dye molecules, especially those located at or close to the interface.

Therefore, for light polarizing dye molecules bearing anion groups, such as sulphonic groups, the first coupling layer has a structure comprising cationic groups or groups capable of forming cationic groups under use conditions. The first intermediate layer can be advantageously based on polysiloxane comprising structures (a), (b), (c), (d), (e) and (f) described above in connection with the light polarizing article of the present invention.

Such polysiloxane layers can be formed by processes known to one of ordinary skill in the art. Generally, in those processes, siloxanes or silanes having the desired molecular structure are allowed to hydrolyze in an aqueous media, with or without various basic or acidic catalysts, without or without pre-condensation, then applied to the targeted surface by, e.g., dipping, spraying, spin coating, flow coating, and the like. The coating is allowed to dry, and is sometimes heated to an elevated temperature where the coating further undergoes polymerization (by condensation, for example), to obtain a robust coating layer.

The light polarizing article of the present invention can be made robust enough to withstand the wear and tear of the typical intended use of the final light polarizing article, such as an ophthalmic lens, which could be subjected to widely fluctuating temperature, high humidity, direct sunlight, and possibly rain and sweat. In many situations, a further protective coating above the light polarizing coating is usually desirable. Thus, in step (D) of the process of the present invention, a further protective layer is formed over the light polarizing layer. As discussed supra, in order to optimize the adhesion between the first coupling layer and the protecting layer, in certain embodiments it is desired that a second coupling layer is formed above the first coupling layer prior to the formation of the protective layer. The second coupling layer differs from the first coupling layer in terms of structure and/or composition. Typically, the second coupling layer is desired to have a structure that is essentially free of ions. It is further desired that the second coupling layer can react with the first coupling layer at the interface to form covalent bonds and/or hydrogen bonds to achieve a high bonding strength between them. For example, where the first coupling layer comprises a polysiloxane, the second coupling layer may be based on a different polysiloxane. During the curing step, it is desired that the surface groups of both layers (such as —OH groups) undergo reactions (such as condensation) to form covalent bonds (such as —Si—O—Si— linkages), whereby a strong network is formed at the interface. A particularly useful category of material for the second coupling layer is based on polyepoxysiloxane, especially if the first coupling layer is based on a cation-containing polysiloxane.

Similar to the surface coating on the substrate, described above, the protective coating formed in step (D) may notably be polysiloxanes based on silanes, e.g., alkoxysilanes and/or chlorosilanes, or compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the above types, which are non-reactive with each other (e.g., isocyanate and vinyl). Particular examples of such surface coatings include coatings based on γ-aminopropyltrimethoxysilane, γ-aminopropyltriethoxysilane and epoxyalkyltrialkoxysilane. These protective layers may be tintable (thus tinted or non-tinted) or non-tintable, depending on the application of the final polarizing article. Non-limiting examples of commercially available coating compositions for such protective layer include: UV cured coatings obtained from UV curable resin such as C4000-60, C5050-60 which are non-tintable, C5051-60 which is tintable and CRC-12 from LESCO, SCH 180, SHC 3100 and SHC Armour 500 from Lens Technology, LLC; thermally cured coatings such as those obtained from the two-component hard coating solution sold under the name TS56H or TS56 T from Tokuyama Corp. which are non-tintable and tintable respectively, or from the one-component HI-GARD® 1080 or HI-GARD® 1035 coating solution from PPG industries, Inc.

Over the protective coating, additional optional coatings may be formed. These coatings include, but are not limited to, hydrophobic (water-repellent or anti-fog) coatings; infrared absorbing coatings; UV absorbing coatings; anti-reflective coatings; photochromic coatings; cushion coatings (shock-absorbing flexible coatings); and the like. These coatings may also be formed on the side of the substrate opposite to the inorganic adhesion layer, the optional sub-layer and the polarizing layer.

FIG. 1 schematically illustrates one embodiment of the process as described in European Patent Application Publication No. 1674898. This process shares a plurality of steps of one embodiment of the process of the present invention. However, as a distinction from the present invention, this process does not disclose a step of forming the first coupling layer (iii) of the present invention. Thus, the end light polarizing article as illustrated in this figure does not have the first coupling layer (iii) that serves to enhance the adhesion between the light polarizing layer and the protective layer. In step (1), a substrate main body 101 is provided. In step (2), a hardcoat surface coating 103 is formed over one surface of the substrate body 101. The combination of 101 and 103 thus forms the substrate 100 as described in European Patent Publication No. 1674898 and in the meaning of the present application. Steps (1) and (2), combined, correspond to step (A) in the process of European Patent Publication No. 1674898 and in the process of the present invention. In step (3), an inorganic sub-layer 105 is formed on the top of the surface layer 103. Step (3) corresponds to step (A1) discussed in European Patent Publication No. 1674898 and in the present invention described above. In step (4), an inorganic adhesion layer 107 is formed on the top of the sub-layer 105. In step (5), the inorganic adhesion layer 107 is brushed to form a plurality of substantially parallel micro-grooves 109 on its top surface. Step (5) corresponds to step (C1) described in European Patent Publication No. 1674898 and in the present invention above. In step (6), a polarizing layer 111 is deposited on the top of the microgrooves 109. Step (6) corresponds to the step (C2) described in European Patent Publication No. 1674898 and the present invention above. In step (7), a protective layer 113 is formed on the top of the polarizing layer 109.

Figure 2:
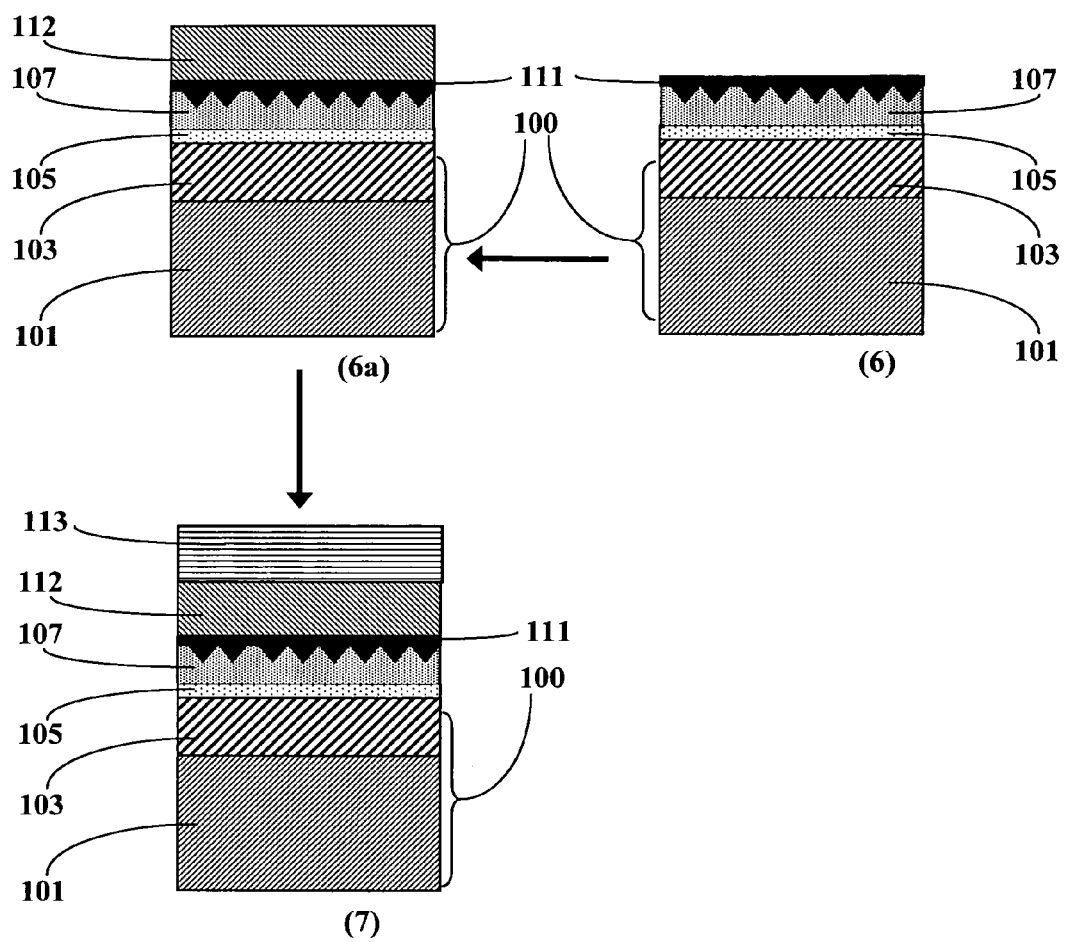
FIG. 2 is a schematic illustration of the structure and part of the manufacture process therefor of an embodiment of the light polarizing article of the present invention.

FIG. 2 illustrates part of an embodiment of the process of the present invention. This embodiment shares the steps (1)-(5) of the process as illustrated in FIG. 1. Therefore, steps (1)-(5) are not shown in FIG. 2. The major distinction between the embodiment of FIG. 2 from the process of FIG. 1 is the inclusion of step (6a) between steps (6) and (7), in which a first coupling layer 112 is formed. As is clear from the above description of the present invention, FIG. 2 is merely an illustration of one embodiment of the present invention. Some of the steps illustrated in FIG. 2 may not be required in the production of certain polarizing articles of the present invention. For example, steps (2) and (3) may be omitted for certain substrate materials.

As mentioned above, the process of the present invention may be applied for many different types of inorganic and organic substrate materials. The same inorganic adhesion layer, such as $SiO_2$ may be deposited on those different substrate materials to obtain similarly good results. Therefore, for different substrate materials, down-stream process steps (C) and (D) and (E) may be performed by using the same process parameters and equipment. This translates to consistency of product quality, higher production yield and lower production cost. The durability of the article produced is particularly high especially in high humidity or boiling tests. Further, the process of the present invention allows the articles of the present invention to be produced in individual small-scale ophthalmic prescription laboratories with relatively low cost.

The following non-limiting examples further illustrate the present invention.

EXAMPLES

In all examples, the lenses prepared were subjected to tests A-C below:

A. Optical Performances

Polarization efficiency ($P_{eff}$) was determined by measuring the parallel transmittance ($T_{\parallel}$) and perpendicular transmittance ($T_{\perp}$) using a visible spectrophotometer and a polarizer. The Polarization efficiency was calculated using the following formula:

$$P_{eff}\% = \frac{T_{\parallel} - T_{\perp}}{T_{\parallel} + T_{\perp}} \times 100\%$$

Haze (%) was determined using a haze-meter (Haze-Gard plus from BYK Gardner).

Haze at "grazing light" (GL) was determined by looking at the milky appearance when the lens is illuminated at a grazing light angle, this milky or hazy appearance being due to light scattering. When the lens appears milky the lens was rated "failed" and when the lens exhibits no light scattering the lens was rated "pass".

B. Hot-Water Resistance

Moisture resistance was evaluated by soaking the polarizing lenses for 30 minutes in hot water at 90° C. Then optical properties were checked and adhesion evaluated as well with the adhesive tape test but without scoring the surface.

The test was pursued up to 3 hours in hot water an then the lens was visually inspected to see if complete or partial delamination has occurred.

After drying and cooling at room temperature, adhesion was evaluated using an adhesive tape test without scoring the surface.

C. Adhesion

Adhesion of the protective layer was evaluated before and after hot water test using a modified crosshatch ASTM D3359 adhesion test: the surface of the anti-scratch coating was scored using a razor blade. The spacing between cuts was 1 mm and the scored pattern consists of 10×10 cuts. Adhesion was the evaluated by applying a pressure sensitive adhesive tape over cuts made in the coating and the tape was quickly peeled off. After the tap was pulled off, the cut area was inspected and rated.

Example 1

The Present Invention 1.1 Preparation of Amino Polysiloxane Dispersion

In this Example, a polysiloxane dispersion was prepared for use as the precursor material for the first coupling layer as follows: 19.5 g of deionized water were added dropwise in 80 g aminopropyltriethoxysilane at about 0° C. under vigorous stirring. The mixture was stirred for 20 hours at room temperature to obtain a clear homogeneous solution. Then this solution was diluted with deionized water to obtain a 1 wt % solution.

1.2 Preparation of Polarizing Lens Article

A polarizing lens article based on a plastic substrate was made as follows:

Step I:

A polyurethane-urea plastic lens sold under the trade name NXT® from Intercast Europe SPA was coated with a HI-GARD® 1080 coating accordingly to the recommended guidelines from the resin supplier. The final hardcoat was 2-3 μm thick. After surface cleaning, a 100 nanometers thick $SiO_2$ coating was vacuum-deposited using a thin chromium layer as adhesion layer deposited on the top of the hard coat prior the $SiO_2$ deposition.

Step II:

The thus coated substrate was then brushed with a wheel made of polyurethane foam having the appropriate shape. The wheel was imbibed with abrasive slurry in order to get parallel microgrooves on the surface of the coated lens. The abrasive slurry used was a mixture of water and micron size alumina particles in order to provide a gentle abrasive brushing. The wheel speed was 340 rpm and the pressure, 40 g/cm², was applied for about 5 seconds. Then the grooved lens was rinsed with deionized water and dried under an infra-red lamp at 51° C. The dry lens was coated by spin coating with 2-3 grams of an aqueous solution containing about 5 wt % of polarizing dyes solution (Varilight solution 2S) supplied by Sterling Optics Inc. (Kentucky, U.S.A.). The dye solution was applied at 300 rpm for 8 sec, then the increased to 400 rpm for 45 sec and then to 1000 rpm for 12 seconds.

Step III:

Subsequently, the polarizing coating was stabilized by immersing the lens in an aqueous solution containing aluminum chloride, calcium hydroxide, and magnesium hydroxide at pH 4 for 30 seconds. This step converts the water soluble dye molecules into its water insoluble form. To complete the insolubilization step, after rinsing with deionized water, the lens was treated by immersion for 15 minutes in a 10 wt % aminopropyltriethoxysilane aqueous solution, followed by rinsing with distilled water and drying at 60° C. for 1 hour.

Then the lens was treated by a second immersion for 30 minutes in a 2 wt % glycidoxypropyltrimethoxysilane aqueous solution, then rinsing with distilled water and drying under a gentle nitrogen flow.

Step IV:

After cooling, the amino polysiloxane dispersion prepared as described above was spin coated at 2000 rpm for 45 seconds on the top of said stabilized polarizing dye layer. This aminopropysiloxane layer was cured by heating the article at 60° C. for 1 hour.

Step V:

The lens was then protected by application of about 2 μm thick acrylic based anti-scratch coating. The anti-scratch coating resin used was sold under the reference SHC 180 from Lens Technology International (CA) modified by adding 4 wt % of 3-Glycidoxypropyltrimethoxysilane (98%). The resin was applied by spin coating with a spin out speed of 1000 rpm for 45 seconds and was cured by exposure to UV light from a fusion bulb H lamp at a belt speed of 2 feet per minute (2 passes).

Step VI:

The lens was subsequently heated at 60° C. for 1 hour, then allowed to cooled down to room temperature.

Example 2

Comparative Example

A polarizing lens was prepared as described in Example 1 except that the step 3 was omitted. Therefore, no aminosiloxane or silsequioxane was deposited before the antiscratch coating was applied.

Example 3

The Present Invention

A polarizing lens based on inorganic glass substrate was made as follows:

Step (I):

A 2 mm thick plano lens made of an inorganic glass material was brushed with a wheel made of polyurethane foam having the appropriate shape. The wheel was imbibed with abrasive slurry in order to get parallels microgrooves on the surface of the coated lens.

The abrasive slurry used was a mixture of water and micron size alumina particles in order to provide a gentle abrasive brushing. The wheel speed was 340 rpm and the pressure, about 40 g/cm$^2$, was applied for about 5 seconds. Then the grooved lens was rinsed with deionized water and dried under an infra-red lamp at 51° C. The dry lens was coated by spin coating with about 2 grams of an aqueous solution containing about 5 wt % of polarizing dye solution (Varilight solution 2S) supplied by Sterling Optics Inc (Kentucky, U.S.A.). The dye solution was applied by spin coating at 300 rpm for 8 seconds.

Step (II):

Then the polarizing coating was stabilized by immersing the lens in an aqueous solution containing aluminum chloride, calcium hydroxide and magnesium hydroxide at pH 4 for 30 seconds. This step converts the water soluble dye into its water insoluble form. To complete the insolubilization step, after rinsing with deionized water, the lens was treated by immersion for 15 minutes in a 10 wt % aminopropyltriethoxysilane aqueous solution, then rinsing with distilled water and drying under a gentle nitrogen flow and thermally cured at 125° C. for 30 minutes.

Step (III):

Then the lens was treated by a second immersion for 30 minutes in a 2 wt % glycidoxypropyltrimethoxysilane aqueous solution, then rinsing with distilled water and drying under a gentle laminar nitrogen flow.

Step (IV):

After drying, an aqueous solution of amino polysiloxane prepared as described in section 1.1 of Example 1 above was spin coated at 2000 rpm for 25 sec on the top of said stabilized dye layer.

Step (V):

Finally, after cooling down, the lens was protected by application of about 2 μm thick acrylic based anti-scratch coating. The anti-scratch coating resin used is sold under the reference SHC 180 from Lens Technology International (CA) modified by adding 4 wt % of glycidoxypropyltrimethoxysilane. The resin was applied by spin coating with a spin out speed of 1000 rpm for 45 seconds and was cured by exposure to UV light from a fusion bulb H lamp at a belt speed of 2 feet per minute (2 passes) with a 80% power.

Step (VI):

Finally, the polarizing lens obtained is thermally cured at 100° C. for 1 hour.

Example 4

Comparative Example

A lens based on inorganic glass material was prepared according to the same protocol as described in Example 3 except that the deposition of the amino polysiloxane (Step (IV)) was omitted.

Test results of the lenses of Examples 1-4 are presented in TABLE I below.

TABLE I

| | | Example 1 | Example 2 (Comparative) | Example 3 | Example 4 (Comparative) |
|---|---|---|---|---|---|
| Before | $P_{eff}(\%)$ | 98.17 | 96.61 | 97.5 | 97.7 |
| Hot Water | Transmittance (%) | 28.20 | 29.30 | 13 | 16 |

TABLE I-continued

|  |  | Example 1 | Example 2 (Comparative) | Example 3 | Example 4 (Comparative) |
|---|---|---|---|---|---|
| Treatment | Haze (%) | 0.35 | 0.38 | 0.25 | 0.25 |
|  | GL | Pass | Pass | Pass | Pass |
|  | Adhesion | Pass | Failed | Pass | Failed |
| After Hot Water Treatment | $P_{eff}$(%) | 97.8 | 96.52 | 97.2 | ND* |
|  | Transmittance (%) | 26.6 | 27.9 | 12.8 | ND |
|  | Haze (%) | 0.54 | 0.52 | 0.33 | ND |
|  | GL | Pass | Pass | Pass | Failed |
|  | Adhesion after 30 minutes | Pass | Failed | Pass | Failed |
|  | Adhesion after 3 hours | Pass | Failed | Pass | Failed |

*In this TABLE I, "ND" means not determined because of complete delamination of the coating.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

The invention claimed is:

1. A light polarizing article comprising a light-transmitting substrate, an essentially single first functional layer (i) comprising a plurality of water-insoluble polarizing dye molecules having ionic groups thereon and a stabilizing polymer component comprising a polysiloxane that is formed by polymerizing a siloxane and at least partly immobilizes the polarizing dye molecules, a second functional layer (ii) differing from the first functional layer, and a first coupling layer (iii) comprising a molecular structure that includes ionic groups having charges opposite that of the ionic groups of the polarizing dye molecules of the first functional layer, or groups capable of forming ions having charges opposite that of the ionic groups of the polarizing dye molecules of the first functional layer, the first coupling layer being disposed between the first functional layer and the second functional layer and abutting both the first functional layer and the second functional layer.

2. The light polarizing article according to claim 1, wherein the second functional layer (ii) has a structure that is essentially free of ionic groups.

3. The light polarizing article according to claim 1, wherein the polarizing dye molecules of the first functional layer include anionic groups, and wherein the first coupling layer (iii) comprises a molecular structure having a cationic group.

4. The light polarizing article according to claim 3, wherein the polarizing dye molecules of the first functional layer include anionic groups, and wherein the first coupling layer (iii) comprises a molecular structure having at least one group selected from the group consisting of: protonated primary amine groups, unprotonated primary amine groups, secondary amine groups, tertiary amine groups, and quaternary amine groups.

5. The light polarizing article according to claim 1, wherein at least a portion of the polarizing dye molecules of the first functional layer have sulphonic groups.

6. The light polarizing article according to claim 1, wherein the first coupling layer (iii) comprises one of a linear polysiloxane and a crosslinked polysiloxane.

7. The light polarizing article according to claim 6, wherein the polysiloxane in the first coupling layer (iii) comprises at least one of the following interconnected structural units and protonated derivatives thereof:

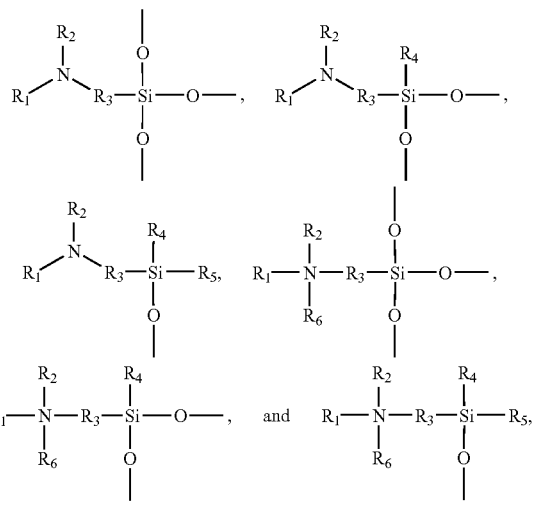

wherein:
$R_1$, independently and at each occurrence, is selected from the group consisting of hydrogen, a substituted C1-C6 alkyl, an unsubstituted C1-C6 alkyl, a substituted C3-C7 alkyl, an unsubstituted C3-C7 cycloalkyl, a substituted phenyl, and an unsubstituted phenyl,

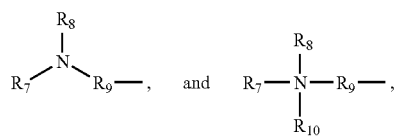

where $R_7$, $R_8$ and $R_{10}$, independently and at each occurrence, are selected from a substituted C1-C6 alkyl, an unsubstituted C1-C6 alkyl, a substituted C3-C7 cycloalkyl, an unsubstituted C3-C7 cycloalkyl, a substituted phenyl, and an unsubstituted phenyl, and
$R_9$, independently and at each occurrence, is selected from a substituted C1-C6 alkylene, an unsubstituted C1-C6 alkylene, a substituted phenylene, and an unsubstituted phenylene, and a substituted oxyalkylene, an unsubstituted oxyalkylene,
$R_2$, independently and at each occurrence, is selected from hydrogen, a substituted C1-C6 alkyl, an unsubstituted C1-C6 alkyl, a substituted C3-C7 cycloalkyl, an unsubstituted C3-C7 cycloalkyl, a substituted phenyl, and an unsubstituted phenyl, $R_3$, independently and at each occurrence, is selected from a substituted C1-C6 alkyl, an unsubstituted C1-C6 alkylene, $R_4$ and $R_5$, independently and at each occurrence, are selected from a substituted C1-C6 alkyl, an unsubstituted C1-C6 alkyl, a substituted C1-C7 cycloalkyl, an unsubstituted C1-C7 cycloalkyl, a substituted phenyl, and an unsubstituted phenyl, and $R_6$, independently and at each occurrence, is selected from a substituted C1-C6 alkyl, an unsubstituted C1-C6 alkyl, a substituted C1-C7 cycloalkyl, an unsubstituted C1-C7 cycloalkyl, a substituted phenyl, and an unsubstituted phenyl.

8. The light polarizing article according to claim 7, wherein the polysiloxane in the first coupling layer (iii) is a polymer formed from a siloxane selected from the group consisting of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, mixtures thereof, and combinations thereof.

9. The light polarizing article according to claim 1, wherein the second functional layer (ii) comprises a scratch-resistant layer, the scratch-resistant layer comprising at least one of poly(meth)acrylates and polysiloxane.

10. The light polarizing article according to claim 1, wherein the stabilizing polymer in the first functional layer (i) is a linear polysiloxane or a crosslinked polysiloxane.

11. The light polarizing article according to claim 1, wherein the stabilizing polymer in the first functional layer (i) is one of a linear polysiloxane and a cross-linked polysiloxane selected from the group consisting of: polyaminosiloxane, polyepoxysiloxane, mixtures thereof, and combinations thereof.

12. The light polarizing article according to claim 1, wherein the polarizing dye molecules are aligned substantially in parallel to each other.

13. A process for making a light polarizing article, the process comprising the steps of:

(A) providing a light transmitting substrate having at least one surface;

(C) forming an essentially single light polarizing layer as a first functional layer (i) over at least part of the surface of the substrate, said light polarizing layer comprising a plurality of polarizing dye molecules having ionic groups thereon and a stabilizing polymer component comprising a polysiloxane that is formed by polymerizing a siloxane and at least partly immobilizes the polarizing dye molecules;

(E) forming a protective layer as a second functional layer (ii) over the light polarizing layer;

wherein between steps (C) and (E), there is an additional step (D) as follows:

(D) forming a first coupling layer (iii) on the light polarizing first functional layer between the first functional layer and the protective second functional layer such that the first coupling layer abuts both the first functional layer and the second functional layer, the first coupling layer comprising a molecular structure having ionic groups, the ionic groups having charges opposite that of the ionic groups of the polarizing dye molecules of the light polarizing layer, or groups capable of forming ions having charges opposite to the polarizing dye molecules of the light polarizing layer.

14. The process according to claim 13, wherein the polarizing dye molecules of the light polarizing layer include anionic groups, and the first coupling layer comprises a molecular structure having at least one of cationic groups and groups capable of forming cationic groups.

15. The process according to claim 13, wherein the polarizing dye molecules of the light polarizing layer include anionic groups, and wherein the first coupling layer comprises a molecular structure having at least one of a protonated primary amine group, an unprotonated primary amine group, a secondary amine group, a tertiary amine group, and a quaternary amine group.

16. The process according to claim 13, wherein at least part of the polarizing dye molecules of the light polarizing layer has a sulphonic group.

17. The process according to claim 13, wherein the first coupling layer comprises one of a linear polysiloxane and a crosslinked polysiloxane.

18. The process according to claim 17, wherein the polysiloxane in the first coupling layer comprises at least one of the following interconnected structures and protonated derivatives thereof:

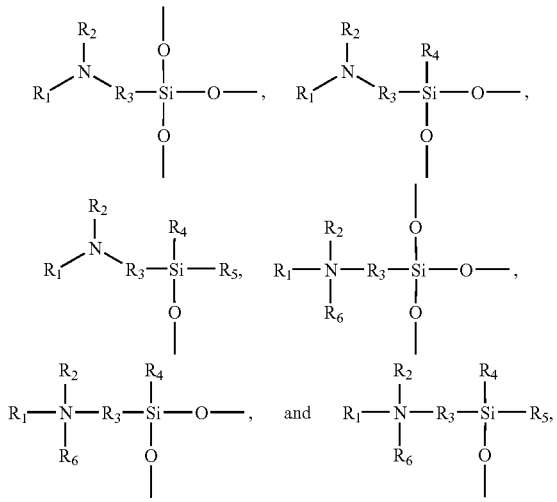

wherein:

$R_1$, independently and at each occurrence, is selected from hydrogen, a substituted C1-C6 alkyl, an unsubstituted C1-C6 alkyl, a substituted C3-C7 cycloalkyl, an unsubstituted C3-C7 cycloalkyl, and a substituted phenyl, an unsubstituted phenyl,

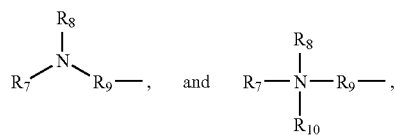

where $R_7$, $R_8$ and $R_{10}$, independently and at each occurrence, are selected from a substituted C1-C6 alkyl, an unsubstituted C1-C6 alkyl, a substituted C3-C7 cycloalkyl, an unsubstituted C3-C7 cycloalkyl, a substituted phenyl, and an unsubstituted phenyl, and $R_9$, independently and at each occurrence, is selected from a substituted C1-C6 alkylene, an unsubstituted C1-C6 alkylene, a substituted phenylene, and unsubstituted phenylene, a substituted oxyalkylene, and an unsubstituted oxyalkylene, R$_2$, independently and at each occurrence, is selected from hydrogen, a substituted C1-C6 alkyl, an unsubstituted C1-C6 alkyl, a substituted C3-C7 cycloalkyl, an unsubstituted C3-C7 cycloalkyl, a substituted phenyl, and an unsubstituted phenyl, R$_3$, independently and at each occurrence, is selected from a substituted C1-C6 alkylene and an unsubstituted C1-C6 alkylene, R$_4$ and R$_5$ independently and at each occurrence, are selected from a substituted C1-C6 alkyl, an unsubstituted C1-C6 alkyl, a substituted C1-C7 cycloalkyl, an unsubstituted C1-C7 cycloalkyl, a substituted phenyl, and an unsubstituted phenyl, and R$_6$, independently and at each occurrence, is selected from a substituted C1-C6 alkyl, an unsubstituted C1-C6 alkyl, a substituted C1-C7 cycloalkyl, an unsubstituted C1-C7 cycloalkyl, a substituted phenyl, and an unsubstituted phenyl.

19. The process according to claim 17, wherein the polysiloxane is selected from polymers of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, mixtures thereof, and combinations thereof.

20. The process according to claim 13, further comprising a step (B) between steps (A) and (C), as follows:
(B) depositing an inorganic intermediate adhesion layer on the surface of the substrate, said inorganic intermediate adhesion layer abutting the polarizing layer after step (C);

and wherein step (C) comprises the following steps (C1) and (C2):
(C1) forming a plurality of substantially parallel micro-grooves on a surface of the inorganic adhesion layer deposited in step (B) that is farther from the substrate; and
(C2) depositing the light polarizing layer comprising polarizing dye molecules over and abutting the micro-grooves formed in step (C1).

21. The process according to claim 20, wherein step (C2) comprises the steps of:
(C2.1) depositing the layer of polarizing dye molecules over and abutting the micro-grooves formed in step (C1); and (C2.2) stabilizing the layer of polarizing dye molecules.

22. The process according to claim 21, wherein step (C2.2) comprises the following steps: (C2.2.1) impregnating the layer of polarizing dye molecules deposited in step (C2.1) with a dispersion of siloxane and/or polysiloxane; and optionally (C2.2.2) at least partially curing the impregnating siloxane and/or polysiloxane.

23. A process according to claim 13, wherein the light polarizing layer and the first coupling layer are allowed to undergo chemical reactions that form covalent bonds therebetween in at least one of step (D) and steps subsequent to step (D).

* * * * *